United States Patent [19]
Wagensonner et al.

[11] 3,966,312
[45] June 29, 1976

[54] FADE-OVER ARRANGEMENT FOR A MOTION PICTURE CAMERA

[75] Inventors: Eduard Wagensonner, Aschheim; Volkmar Stenzenberger, Unterhachung, both of Germany

[73] Assignee: AGFA-Gevaert, A.G., Leverkusen, Germany

[22] Filed: Dec. 5, 1974

[21] Appl. No.: 530,044

[30] Foreign Application Priority Data
Dec. 15, 1973 Germany............................ 2362506

[52] U.S. Cl.............................. 352/91 C; 352/91 S; 352/141
[51] Int. Cl.².......................................... G03B 21/36
[58] Field of Search.................. 352/91 C, 91 S, 141

[56] References Cited
UNITED STATES PATENTS

| | | | |
|---|---|---|---|
| 3,419,325 | 12/1968 | Mayr et al. | 352/91 S |
| 3,623,989 | 11/1971 | Mayr et al. | 352/91 S |
| 3,792,920 | 2/1974 | Mayr et al. | 352/91 S |
| 3,801,194 | 4/1974 | Pelte et al. | 352/91 C |
| 3,813,680 | 5/1974 | Wagensonner et al. | 352/141 |

*Primary Examiner*—L. T. Hix
*Assistant Examiner*—Russell E. Adams, Jr.
*Attorney, Agent, or Firm*—Michael S. Striker

[57] ABSTRACT

A bridge circuit contains a photoelectric resistor positioned behind the diaphragm and thus having a resistance varying as a function of the light falling on the film. A second arm of the bridge circuit contains a resistor. The bridge circuit output is connected to the inputs of a differential amplifier whose output controls a step motor which adjusts the size of the aperture until the bridge is balanced. For fade-out, an additional resistor is inserted in the second arm by opening a short-circuiting switch, thus causing the bridge to become unbalanced and the step motor to change the aperture until it is again in balance. This balance will take place at a predetermined low illumination suitable for fade-out. Closing the switch will result in fade-in, namely an opening of the aperture until the circuit is again in balance. The output signal from the bridge circuit thus controls the aperture even during fade-in and fade-out.

4 Claims, 2 Drawing Figures

FADE-OVER ARRANGEMENT FOR A MOTION PICTURE CAMERA

BACKGROUND OF THE INVENTION

This invention relates to a motion picture camera. In particular it relates to a motion picture camera which is to have fade-over capabilities. In particular, the camera normally has a bridge circuit which includes a light-sensitive receiver whose resistance varies as a function of light impinging thereon. An unbalance in the bridge results in the applicaton of a control signal which causes a step motor coupled to the diaphragm to increase or decrease the aperture of the diaphragm in correspondence to the polarity and magnitude of the output signal from the bridge and until such time as the bridge output signal is again indicative of a balanced bridge.

SUMMARY OF THE INVENTION

It is an object of the present invention to supply a motion picture camera of the above-described type with a particularly simple fade-in and fade-out arrangement which operates independently of the ambient illumination to effect a fade-over in a substantially constant time period.

The present invention resides in a motion picture camera having film and a diaphragm having a variable aperture positioned in the path of light to said film. It comprises bridge circuit means having a first arm including a photoelectric receiver positioned following said diaphragm in the path of said light for creating a first electrical impedance varying as a function of light impinging thereon. The bridge circuit means further comprise a second, third and fourth arm respectively including a second, third and fourth impedance and furnish a bridge output signal varying as a function of said first and second impedance at a first and second output terminal. Aperture control means are provided which are coupled to the aperture and connected to the bridge circuit means, for varying the size of the aperture until the bridge output signal is equal to a balanced bridge output signal indicative of a determined relationship between said first and second impedance. Finally, fade-out switch means are provided which are connected to the second impedance for changing the value thereof substantially instantaneously to a predetermined fade-out value corresponding to a predetermined decrease of light falling on said photoelectric receiver means. The fade-out switch means are responsive to external activation. This operation of the fade-out switch means causes a sudden unbalance in the bridge circuit which results in operation of the electromagnetic aperture control means until such time as the resistance of the photoreceiver eaches a value corresponding to the changed value of the second impedance. During the fade-out phase the control arrangement operates independent of the ambient light conditions. If these light conditions change before beginning of the fade-in, for example because the next subsequent scene has a higher intensity of illumination, then the aperture prior to beginning of the fade-in is adjusted to a sufficiently small value until the balance of the bridge is again obtained. Operation of the fade-out switch means for a second time, that is closing the switch if it was previously opened and vice versa, results in the initiation of the fade-in. During fade-in the impedance of the second impedance is changed back to its original value, again causing the bridge at first to be suddenly unbalanced. The aperture is then increased until such time as the balance has again been reestablished. At this point of course the impedance of the photoreceiver has a predetermined relationship with the second impedance. The quantity of light falling onto the film is a first predetermined value independent of the ambient light conditions prior to the fade-out and a second value, differing by a predetermined constant from the first value following the fade-out. The ratio of illumination falling on the film just prior to and following fade-out is thus independent of the brightness of the object being photographed.

In a preferred embodiment of the present invention the photoresistor and second impedance are connected in series to form one branch of the bridge. The second impedance comprises a first and second resistor connected in series and the fade-out switch means comprise a switch which, when closed, short-circuits the second resistor.

Further, in a preferred embodiment of the present invention, the aperture control means comprise a differential amplifier which has a direct input connected to the bridge output terminal which is the common point of the photoresistor and the second impedance and an inverting input connected to the common point of the third and fourth impedance. The output circuit of the differential amplifier serves to control the application of pulses to a step motor whose windings are energized in a first sequence for opening the aperture and in a second sequence for closing same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
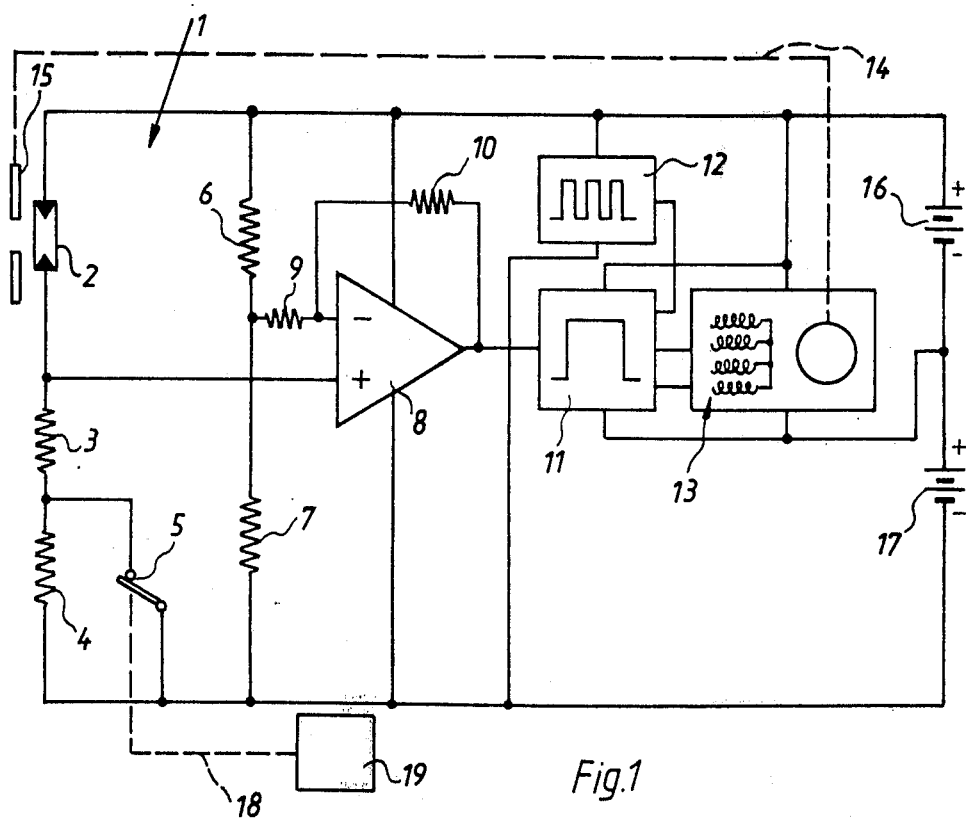
FIG. 1 is a circuit diagram showing the fade-over arrangement of the present invention.

A preferred embodiment of the present invention will now be described with reference to the drawing.

FIG. 1 shows a bridge circuit 1 which includes a photoresistor 2 which is arranged in its first arm. The second impedance, forming the second arm of the bridge circuit, includes a resistor 3 connected in series with a resistor 4. A switch 5 short-circuits resistor 4 when closed and is one embodiment of fade-out switch means. The third arm of the bridge circuit includes a resistor 6, while the fourth arm, connected in series with the third arm, includes a resistor 7. Resistors 6 and 7 are, respectively, preferred embodiments of third and fourth impedances. The common point of photoresistor 2 and resistor 3 is connected to the direct input of an operational amplifier, here a differential amplifier 8 whose inverting input is connected via a resistor 9 with the common point of resistors 6 and 7. The common point of resistors 6 and 7 is herein referred to as the second bridge output terminal, while the common point of photoresistor 2 and resistor 3 is herein referred to as the first bridge output terminal. The output of differential amplifier 8 is connected to its inverting input through a resistor 10. A gating circuit 11 is connected to the output circuit of operational amplifier 8. One input of the gating circuit is connected to a pulse generator 12, while a first and second output of the gating circuit are connected to the forward and reverse control circuit for a step motor, 13. A mechanical coupling between the step motor and the diaphragm 15 is denoted by reference numeral 14. An arrangement wherein the output signal of a differential amplifier controls a gate which in turn controls the application of pulses to the control windings of a step motor is described in U.S. Pat. No. 3,813,680 (Wagensonner et al). Specifically differential amplifier 8 of the present invention corresponds to the differential amplifier of U.S. Pat. No. 3,813,680; gating circuit 11 corresponds to unit 3 of this patent and pulse generator 12 to pulse generator 2 of U.S. Pat. No. 3,813,680.

The fade-out switch 5 is mechanically coupled through a coupling 18 to an external activating arrangement 19.

The above-described arrangement operates as follows:

First let it be assumed that the bridge is balanced with switch 5 closed and that therefore step motor is at standstill. For a particular ambient intensity of illumination the aperture of diaphragm 15 is thus set to a corresponding size. Resistors 2 and 3 have a predetermined relationship corresponding to the ratio between resistors 6 and 7. In a preferred embodiment of the present invention this relationship may be equality. Because of this control of the aperture, the film receives light of an intensity denoted by $B_1$ in FIG. 2. If now the photographer operates the activating arrangement 19 in such a manner that switch 5 opens, the additional resistance is suddenly inserted into the bridge circuit and causes this bridge circuit to become unbalanced. The bridge output signal, namely the potential difference created between the direct and the inverting input of operational amplifier 8 will cause a voltage to appear at its output which in turn causes gate 11 to open and allow pulses from pulse generator 12 to be transmitted to the motor control circuit 13. The pulses will be applied in such a manner that the step motor is activated to close diaphragm 15 until such time as the bridge is again inbalance. As soon as the bridge is again in balance, no output signal appears at the output terminal of differential amplifier 8, gate 11 is closed and the step motor is again brought to standstill condition. Under the now existing conditions a light denoted by intensity $B_2$ in FIG. 2 falls on the film. The decrease of light that has taken place is approximately equal to a decrease of six light settings. The intensity of illumination $B_2$ is thus extremely small so that an efficient fade-out has been achieved. The arrangement has the advantage that not only is the fade-out accomplished, but diaphragm 15 remains under control of the bridge circuit throughout.

Figure 2:
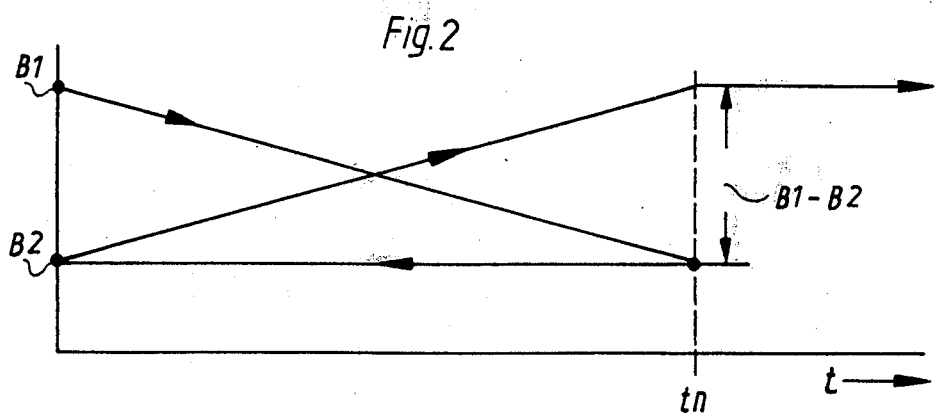
FIG. 2 is a diagram showing the variation of light intensity as a function of time during fade-in and fade-out.

As shown in FIG. 2 the light has been decreased from an intensity $B_1$ to an intensity $B_2$ in a time period $t_n$ which is associated with frame $n$. The film is now rewound for a length corresponding to the length over which the fade-out took place. This is accomplished by a mechanism not shown which can be the mechanism set forth, for example, in U.S. Pat. No. 3,712,720 (Winkler et al). Following the rewind, the fade-in process is initiated by closing of switch 5. Prior to this initiation of the fade-in, the illumination intensity $B_2$ has of course been maintained independent of the scene being photographed, since diaphragm 15 is still under control of the bridge circuit. If switch 5 is now closed, the resistance of the second bridge arm is again decreased by the amount of resistance of resistor 4. After time $t_n$ the illumination intensity $B_1$ has again been reached. Bridge circuit 1 is now again in its original balanced condition. It should be noted that the difference in illumination falling on the film, $B_1$-$B_2$ during the fade-over process in independent of the ambient light conditions. The diaphragm is operated throughout the fade-over under control of the bridge circuit.

While the invention has been illustrated and described as embodied in a specific type of bridge circuit and aperture control means, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims.

We claim:

1. In a motion picture camera having film and a diaphragm having a variable aperture positioned in the path of light to said film, a fade-over arrangement, comprising, in combination, bridge circuit means having a first arm including photoelectric receiver means positioned following said diaphragm in said path of light to said film for creating a first electrical impedance varying as a function of light impinging thereon, a second arm including a second impedance, and a bridge output terminal for furnishing a bridge output signal varying as a function of both said first and second impedances, said bridge output signal being a balanced bridge output signal when a predetermined relationship exists between said first and second impedances; fade-out switch means connected to said second impedance for changing the value thereof upon external activation from a first predetermined value to a second predetermined value and in a direction for changing the quantity of light required for furnishing said balanced bridge output signal from a first predetermined quantity to a second predetermined quantity substantially less than said first predetermined quantity but exceeding zero; and aperture control means connected to said bridge output terminal for decreasing the size of said aperture under control of said bridge output signal until said bridge output signal is said balanced bridge output signal and said aperture admits only said second predetermined quantity of light to said photoreceiver means, whereby the quantity of light falling on said photoelectric receiver means is decreased by a predetermined quantity independent of the light conditions for each fade-out and whereby said aperture control means remains under control of said bridge output signal and thereby responsive to light conditions during and after fade-out.

2. A motion picture camera as set forth in claim 1, wherein said second impedance is connected in series with said first electrical impedance at a common point constituting said first output terminal; wherein said fourth impedance is connected in series with said third impedance at a second common point constituting said second output terminal; and wherein said aperture control means comprise a differential amplifier having a direct and inverting input respectively connected to said first and second output terminal, and a differential amplifier output for furnishing a control signal varying as a function of said bridge output signal, and stepmotor means connected to said differential amplifier means and coupled to said diaphragm for varying said aperture of said diaphragm in response to said control signal.

3. A motion picture camera as set forth in claim 1, wherein said second impedance is connected in series with said photoreceiver means creating said first electrical impedance at a common point constituting a first bridge output terminal; wherein said bridge circuit means further comprises a third and fourth arm respectively including a third and fourth impedance, said fourth impedance being connected in series with said third impedance at a common point constituting a second bridge output terminal; and wherein said aperture control means comprises a differential amplifier having a direct and inverting input respectively connected to said first and second bridge output terminal, and a differential amplifier output for furnishing a control signal varying as a function of said bridge output signal, and stepmotor means connected to said differential amplifier means and coupled to said diaphragm for varying said aperture of said diaphragm in response to said control signal.

4. A motion picture camera as set forth in claim 3, wherein said second impedance comprise a first and second resistor connected in series; and wherein said fade-out switch means comprise a switch connected in parallel with said second resistor for short-circuiting said second resistor upon external activation.

* * * * *